United States Patent [19]
Tokunaga et al.

[11] Patent Number: 5,169,483
[45] Date of Patent: Dec. 8, 1992

[54] TIRE COMPONENT MEMBER ATTACHING APPARATUS

[75] Inventors: Toshio Tokunaga; Yasuhiro Hara; Tatsuo Nakamura, all of Kodaira, Japan

[73] Assignee: Bridgestone Corporation, Tokyo, Japan

[21] Appl. No.: 615,094

[22] Filed: Nov. 19, 1990

[30] Foreign Application Priority Data

Nov. 20, 1989 [JP] Japan .................................. 1-301589

[51] Int. Cl.⁵ .............................................. B29D 30/28
[52] U.S. Cl. ............................ 156/410; 156/130.300; 156/408; 156/421
[58] Field of Search ........................... 156/408–413, 156/421, 421.6, 130.3, 402

[56] References Cited

U.S. PATENT DOCUMENTS

| | | | |
|---|---|---|---|
| 1,865,540 | 7/1932 | Reid et al. | |
| 2,362,180 | 11/1944 | Wilson | 156/408 |
| 3,030,261 | 4/1962 | Roesch | 156/411 |
| 3,056,448 | 10/1962 | Dearing | 156/411 |
| 3,097,984 | 7/1963 | Godfrey, Jr. | |
| 3,819,449 | 6/1974 | Caretta | 156/413 |

FOREIGN PATENT DOCUMENTS

| | | |
|---|---|---|
| 1812327 | 7/1969 | Fed. Rep. of Germany . |
| 1579161 | 1/1970 | Fed. Rep. of Germany . |
| 532767 | 10/1954 | France . |

Primary Examiner—Geoffrey L. Knable
Attorney, Agent, or Firm—Sughrue, Mion, Zinn, Macpeak & Seas

[57] ABSTRACT

An apparatus for attaching a tire component member to a rotating toroidal green case includes support shafts whose axes are located substantially in a plane including a rotational axis of the green case. Stitching rollers are supported by the support shafts and rotatable about the axes of the support shafts, respectively. An urging device moves the stitching rollers toward the green case to urge outer circumferences of the stitching rollers against the tire component member. A swing device serves to swing the stitching rollers to continuously move contact points of the stitching rollers with the tire component member from an axially inside to an axially outside, to attach the tire component member to the outer surface of the green case.

6 Claims, 6 Drawing Sheets

FIG_6
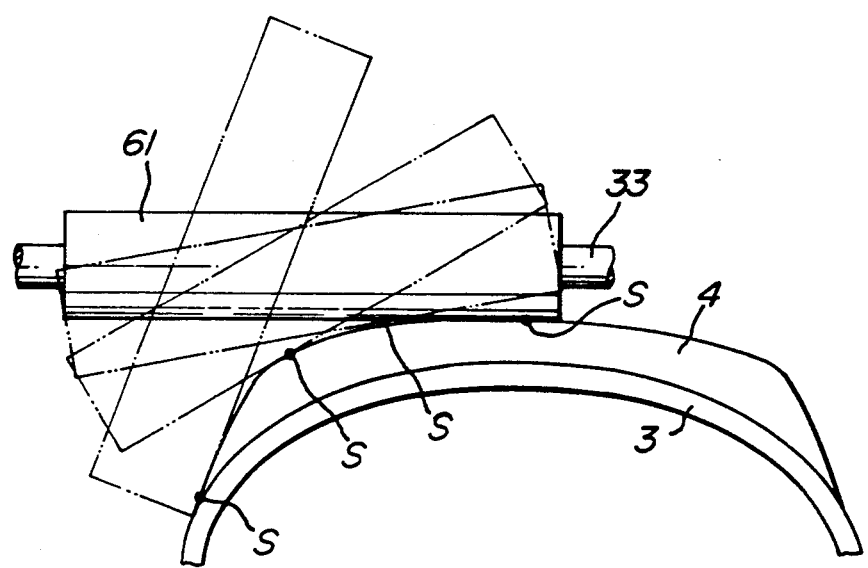

TIRE COMPONENT MEMBER ATTACHING APPARATUS

BACKGROUND OF THE INVENTION

This invention relates to an apparatus for attaching a tire component member to a toroidal green case.

In producing radial tires, it is common practice to attach a tire component member to a green case to form a green tire. In more detail, after a green case formed in a first forming unit has been toroidally expanded in a second forming unit, a tire component member such as a belt, tread band or the like is fitted on and attached to the green case to form a green tire.

There have been various apparatus for attaching a tire component member to a toroidal green case, as disclosed e.g. in U.S. Pat. No. 3,819,449. This disclosed apparatus includes a first roller adapted to be brought into contact with a center portion of a green case and rotatable about an axis in parallel with a rotational axis of the green case, and plurality of pairs of second rollers arranged in symmetry on axially outer sides of the first roller and rotatable about axes in parallel with the axis of the first roller. The apparatus further includes a plurality of moving means for individually moving the first and second rollers toward and away from the green case.

In attaching a tire component member to a green case with such a disclosed apparatus, at the outset, the first roller is advanced toward the green case by means of the moving means and the axially center portion of the tire component member is attached to the green case. Thereafter, the pairs of the second rollers are advanced progressively in the order of those nearer to the first roller toward the green case by means of the moving means. The tire component member is then attached to the green case successively from the axially inner side to the axially outer side with the aid of the advanced second rollers.

With such an attaching apparatus, however, there are clearances between the adjacent rollers, which cause air pockets between the green case and the tire component member at locations corresponding to the clearances, or nonuniform or locally weak attaching strength therebetween. Moreover, outer circumferences of the second rollers are adapted to be equally in contact with the tire component member at any axial position of the outer circumference, notwithstanding different circumferential lengths of the second rollers at the axial positions owing to their frustoconical shapes. Consequently, there is a tendency for the second rollers to slip on the tire component member in circumferential directions in the attaching operation, with resultant scratches or scores on the surface of the tire component member. Furthermore, the prior art apparatus requires a number of the rolls and moving means making the apparatus complicated in construction and very expensive.

SUMMARY OF THE INVENTION

It is an object of the invention to provide an improved apparatus for attaching a tire component member to a green case, which eliminates all the disadvantages of the prior art described above, which is simple in construction and inexpensive to manufacture and is able to attach a tire component member to a green case rigidly and uniformly, without remaining the air therebetween and without causing any scratch or score on the tire component member in attaching it.

In order to accomplish this object, the apparatus for attaching a tire component member to a rotating toroidal green case according to the invention comprises support shafts whose axes are located substantially in a plane including a rotational axis of the green case, stitching rollers supported by the support shafts and rotatable about the axes of the support shafts, respectively, urging means for moving the stitching rollers toward the green case to urge outer circumferences of the stitching rollers against the tire component member, and swing means for swinging the stitching rollers to continuously move contact points of the stitching rollers with the tire component member from an axially inside to an axially outside to attach the tire component member to an outer surface of the green case.

It is assumed that a tire component member has been arranged on the outer side of a toroidal green case. The stitching rollers are then moved toward the green case by means of the urging means to urge the stitching rollers against the tire component member, while the green case is rotated about the rotational axis. Thereafter, the stitching rollers are swung in a plane including the rotational axis of the green case by means of the swing means. As a result, the stitching rollers are rotated about the axes of the support shafts with the aid of rotating force received from the green case, while contact points of the stitching rollers with the tire component member move continuously from the axially inside to the axially outside of the stitching rollers.

Consequently, the contact points between the stitching rollers and the tire component member move along spiral passages around the circumference of the tire component member. Moreover, as the tire component member is attached to the green case, while being urged against the green case at the contact points, attaching the tire component member against the green case is performed along the spiral passages. In this case, as the contact points of the stitching rollers with the tire component member move continuously along the spiral passages from the axially inside to the axially outside in the above manner, the air between the tire component member and the green case is continuously driven toward the axially outside direction to be exhausted in a reliable manner, while the tire component member is subjected at any points to equal attaching force so that the tire component member is rigidly and uniformly attached to the green case with a great certainty.

During the attaching operation, moreover, the stitching rollers contact the tire component member only at the contact points which are narrow areas. Therefore, it is possible to effectively eliminate circumferential slippage between the stitching rollers and the tire component member, or scratch or score on the surface of the tire component member. Moreover, only one pair of stitching rollers are needed for attaching a wide variety of tire component members. Therefore, the apparatus according to the invention is inexpensive and simple in construction with less number of the rollers and urging means. Furthermore, even when it is impossible to attach all the requisite zone of the tire component member to the green case, the attaching can be performed by a combination with another stitching roller.

In a preferred embodiment of the invention, each stitching roller is formed to increase its diameter from the axially inner side to the axially outer side. The swing means comprises a connecting shaft mounted on and fixed to the support shafts and having a rotational axis inclined at a predetermined angle to the axes of the support shafts, and rotating means for swinging the stitching rollers by rotating the connecting shaft about the rotational axis. With this arrangement, the stitching rollers are rotated in a reliable manner notwithstanding the simple construction.

The invention will be more fully understood by referring to the following detailed specification and claims taken in connection with the appended drawings.

BRIEF DESCRIPTION OF THE DRAWINGS

FIG. 6 is a schematic sectional front elevation illustrating another embodiment of the invention.

EXPLANATION OF THE PREFERRED EMBODIMENTS

Figure 1:
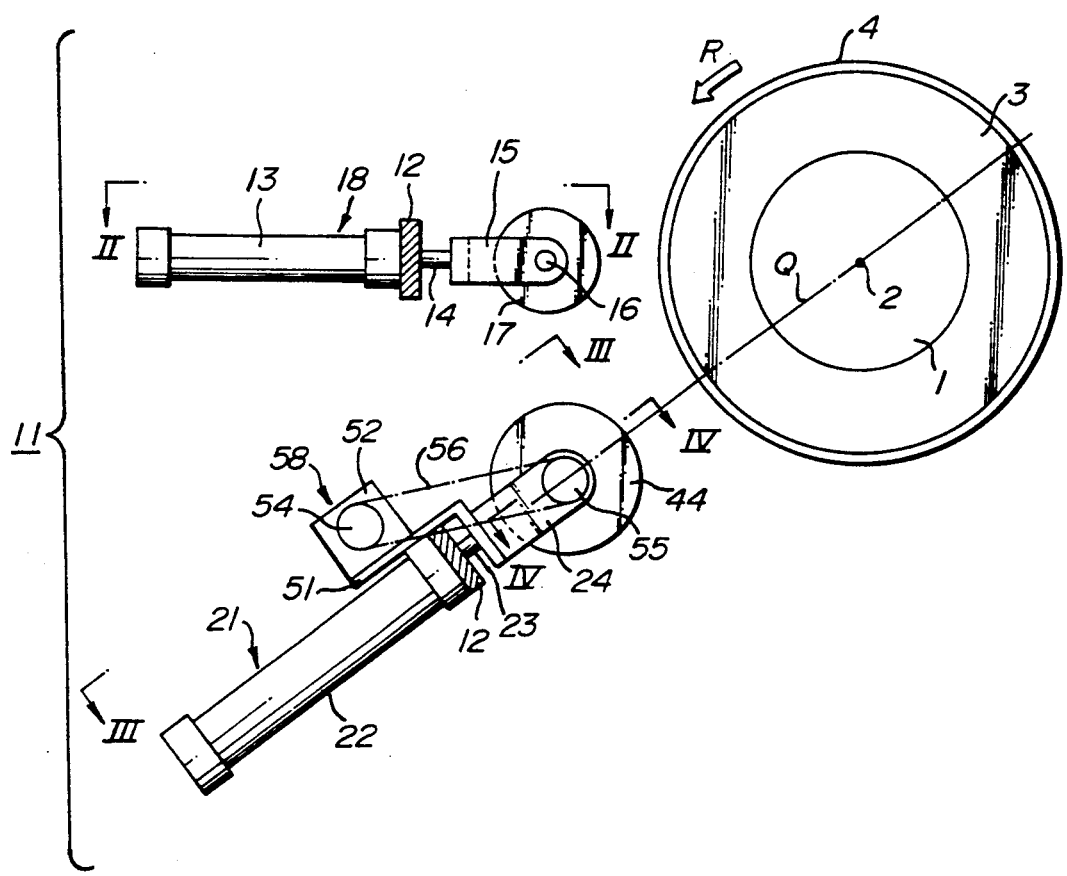
FIG. 1 is a schematic side view illustrating one preferred embodiment of the apparatus according to the invention.

As mentioned hereinbefore, in producing radial tires, a green case is formed in a first forming unit (not shown) and is subjected to subsequent processes in a second forming unit. To this end, as shown in FIG. 1, a forming drum 1 of the second forming unit is rotated by a motor (not shown) and is expansible and contractible so that a green case 3 mounted around the forming drum 1 is expanded into a toroidal shape. When the forming drum 1 is rotated, the green case 3 mounted thereon is also rotated about a rotational axis 2 of the forming drum 1. A cylindrical tire component member 4, for example, a belt or tread band is fitted on the green case 3 on its radially outward side.

Figure 2:
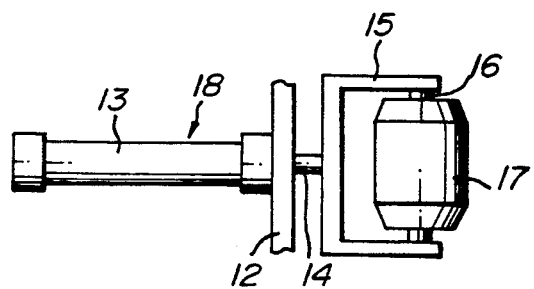
FIG. 2 is a view illustrating the center attaching unit used in the apparatus, as seen the direction shown in arrows II in FIG. 1.

An attaching apparatus 11 according to the present invention is arranged in front of the forming drum 1. More particularly, a cylinder 13 is fixed on its piston rod side to a frame 12 of the attaching unit 11 so that the cylinder 13 extends in a radial direction of the forming drum 1. A support plate 15 is fixed to the rod end of a piston rod 14 of the cylinder 13. To two arms of the support plate 15 are secured both ends of a shaft 16 in parallel with the rotational axis 2 of the forming drum 1 (FIG. 2). On a center of the shaft 16 is rotatably supported a cylindrical roller 17 concentric to the shaft 16. When the cylinder 13 is actuated to extend the piston rod 14, the cylindrical roller 17 moves toward the forming drum 1 to urge the axially center portion of the tire component member 4 against the green case 3 so that these members are attached to each other.

The cylinder 13, the support plate 15, the shaft 16, and the cylindrical roller 17 form as a whole a center attaching unit 18 for attaching the axially center portion of the tire component member 4 to the green case 3.

Figure 3:
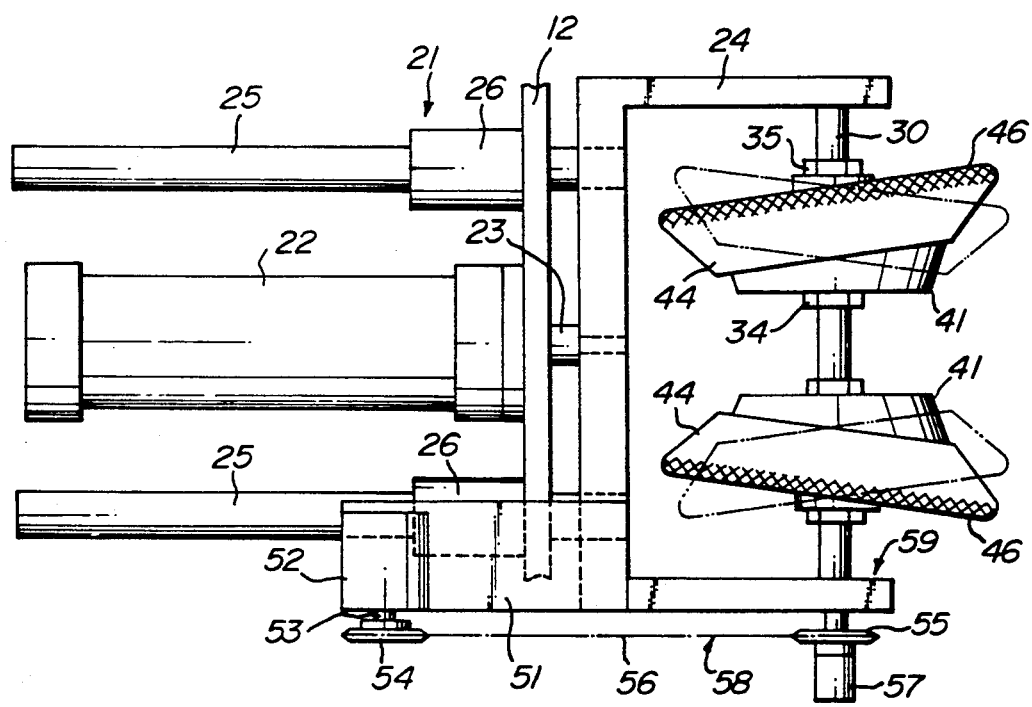
FIG. 3 is a view illustrating the both side attaching unit used in the apparatus, as seen in the direction shown in arrows III in FIG. 1.
Figure 4:
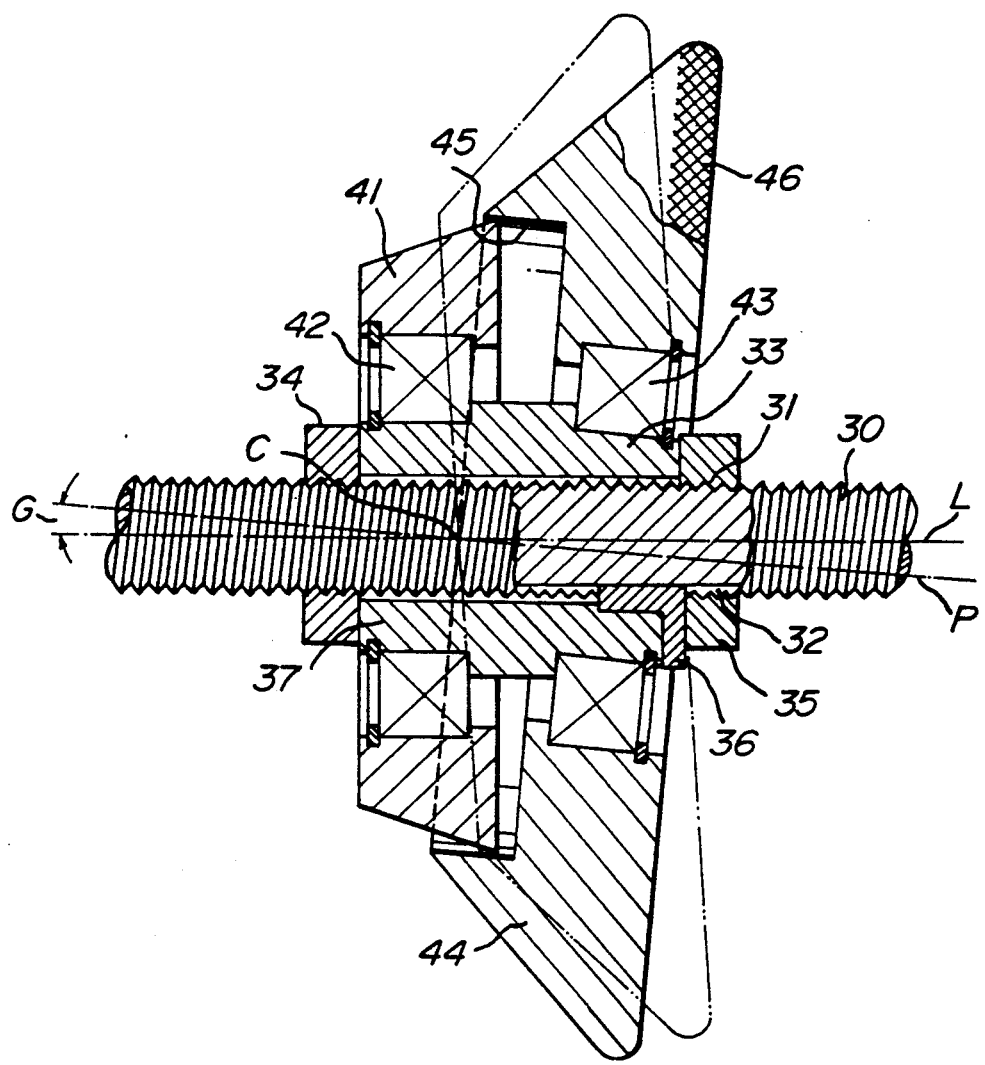
FIG. 4 is a sectional view illustrating the stitching roller used in the apparatus, taken along the line IV—IV in FIG. 1.

Furthermore, as shown in FIGS. 1, 3 and 4, there is arranged, below the center attaching unit 18, a side attaching unit 21 for attaching both axially side portions of the tire component member 4 to the green case 3. The side attaching unit 21 comprises a cylinder 22 as urging means fixed on its rod side to the frame 12 and extending in a radial direction of the forming drum 1. A support plate 24 is fixed to the rod end of a piston rod 23 of the cylinder 22. To the support plate 24 are fixed the forward ends of a pair of guide rods 25 in parallel with the cylinder 22. The guide rods 25 are slidably inserted into guide members 26 fixed to the frame 12.

U-shaped arms of the support plate 24 rotatably support a connecting shaft 30 whose rotational axis L (FIG. 4) extends in parallel with the rotational axis 2 and located in a plane Q (FIG. 1) including the rotational axis 2 of the green case 3. The connecting shaft 30 is formed on its outer circumference with screw threads 31 and with key ways 32 extending in parallel with the rotational axis L. Substantially cylindrical support shafts 33 are fitted on the connecting shaft 30 on both sides near ends thereof. The axis P of each of the support shafts 33 coincident with the axis of a stitching roller, latter described, is located substantially in the plane Q including the rotational axis 2 and intersects the rotational axis L of the connecting shaft 30 at a predetermined angle G.

The inclining direction of the axis P of each support shaft 33 in an initial position extends progressively away from the green case 3 from the center to one axial end of the connecting shaft 30. In this case, the predetermined angle G is preferably from 3° to 5°. If the angle G is less than 3°, a stitching roller 44 to be described hereinafter will swing only within a narrow range when the connecting shaft 30 is rotated, with the result that attachment of a tire component member is limited only within a narrow range. On the other hand, if the angle G is more than 5°, the stitching roller 44 will swing within an excessively wide range when the connecting shaft 30 is rotated, with the result that a large clearance will occur between the stitching roller 44 and a conical roller 41 to be described hereinafter to cause stripe traces on the tire component member 4 when it is attached to the green case 3.

Nuts 34 and 35 are threadedly engaged with the screw-threads 31 of the connecting shaft 30 on axially inner and outer sides of each of the support shaft 33 for connecting the supporting shaft 33 and the connecting shaft 30 by embracing the support shaft 33 by means of the nuts 34 and 35. These nuts 34, 35 serve to determine the axial position of the stitching roller 44 upon alteration in the tire size. A key 36 is inserted into the key groove 32 and fixed to the support shaft 33 for fixing it in a predetermined angular position relative to the connecting shaft 30. Each support shaft 33 is provided on its axially inner side with a substantially cylindrical extension portion 37 extending in a coaxial direction to the connecting shaft 30.

A conical roller 41, which is frustoconical in shape, is supported through a bearing 42 on the extension portion 37 of each of the support shafts 33 and coaxial thereto so that the conical roller 41 is rotatable about the rotational axis L of the connecting shaft 30 and hence the extension portion 37. Moreover, the conical roller 41 increases its diameter from the axially inner side to the axially outer side. On the other hand, a stitching roller 44 is supported through a bearing 43 on each of the support shafts 33 and rotatable about the axis P of the support shaft 33. The stitching roller 44 increases its diameter from the axially inner side to the axially outer side to form a frustoconical shape as a whole.

Each stitching roller 44 is formed in an axially inner surface with an annular recess 45 having a diameter preferably slightly larger than the diameter of the conical roller 41 at an axially outer end. The annular recess 45 of the stitching roller 44 receives therein part of the axially outer end of the conical roller 41. The stitching roller 44 is formed on the outer circumference of the axially outer end with a rough or coarse surface 46 which may be formed, for example, by rolling a knurl on the surface. The conical roller 41 and the stitching roller 44 are urged against the outer surface of the tire component member 4 when the cylinder 22 is actuated to extend the piston rod 23.

To the support plate 24 is fixed a bracket 51 on which a motor is mounted. A chain 56 extends around a sprocket 54 fixed to the output shaft 53 of the motor 52, and around another sprocket 55 fixed to the connecting shaft 30. As a result, when the motor 52 is energized, the connecting shaft 30 is rotated about the rotational axis L. The rotation of the connecting shaft 30 causes the support shafts 33 to rotate by a same angle as that of the connecting shaft 30. In this case, because the axis P of each of the support shafts 33 intersects the rotational axis L of the connecting shaft 30 at the predetermined angle G, the stitching roller 44 performs a precession having a center at the intersection point C of the axes L and P. As a result, the rotating movement of the stitching roller 44 has a swing component about the intersection point C in the plane Q. The swing angle of the swing component is twice the angle G.

A rotary encoder 57 is connected to the connecting shaft 30 for detecting rotations or annular movements of the connecting shaft 30, to control the operation of the motor 52 on the basis of the output signal from the encoder 57.

The motor 52, the sprockets 54 and 55, the chain 56 and the rotary encoder 57 form as a whole a rotating mechanism 58 for swinging the stitching rollers 44 by rotating the connecting shaft 30 about the rotational axis L. The rotating mechanism 58 and the connecting shaft 30 form as a whole swing means 59 for swinging the stitching rollers 44 in the plane Q to continuously displace the contact points of the stitching rollers 44 with the tire component member 4 from the axially inside to the axially outside of the stitching rollers 44.

The operation of the apparatus described above with reference to one specific embodiment of the invention will be explained below.

First, a green case 3 formed in the first forming unit is transferred to and mounted on the forming drum 1. Thereafter, the green case 3 is expanded into a toroidal shape. A cylindrical tire component member 4 formed on a forming drum (not shown) is then transferred to the forming drum 1 and fitted on the toroidally deformed green case 3 on its radially outer side.

Figure 5A:
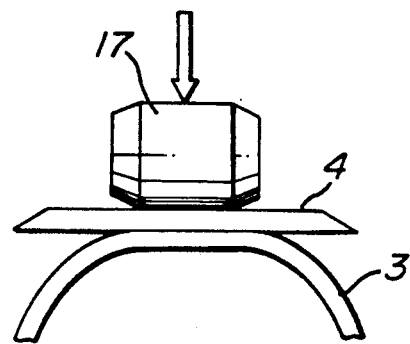
FIGS. 5a-5d are explanatory views explaining the operation of the apparatus shown in FIG. 1.

The forming drum 1 is then actuated to rotate the green case 3 and the tire component member 4 in unison in a direction shown by an arrow R. Then, the cylinder 13 of the center attaching unit 18 is actuated so as to extend the piston rod 14 to move the cylindrical roller 17 toward the tire component member 4. As a result, the cylindrical roller 17 urges the axially center portion of the tire component member 4 against the green case 3 so that the axially center portion of the tire component member 4 is attached to the green case 3 as shown in FIG. 5a. In this case, as the green case 3 and the tire component member 4 are being rotated as described above, the axially center portion of the tire component member 4 is attached to the green case over all its circumference by urging the cylindrical roller 17 against the tire component member 4 at least while the green case performs one turn of rotation.

Figure 5B:
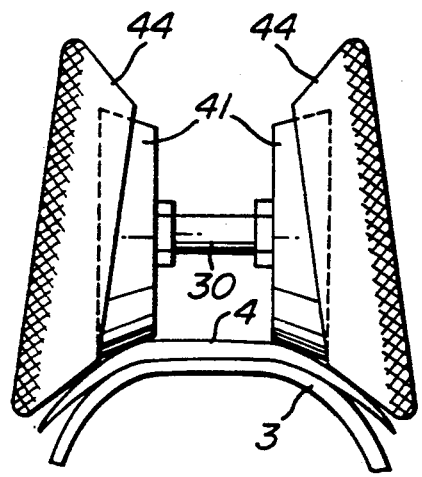

The cylinder 22 of the side attaching unit 21 is then actuated to extend the piston rod 23 to move the conical roller 41 and the stitching rollers 44 toward the tire component member 4. In this case, the stitching rollers 44 are so inclined that they diverge toward the green case. That is, the distance between edges of both the stitching rollers nearest to the green case 3 assumes the maximum amount, as particularly shown in FIG. 5b. When the conical rollers 41 are urged against the tire component member 4 by the above movement of the rollers 41 and 44 toward the tire component member 4, outer circumferences of the stitching rollers 44 scarcely contact or do not contact the tire component member at all. Under this condition, the green case 3 is rotated at least one turn of rotation so that narrow zones of the tire component member 4 on both outer sides of its axially center portion are attached to the green case 3 over all the circumference.

Figure 5C:
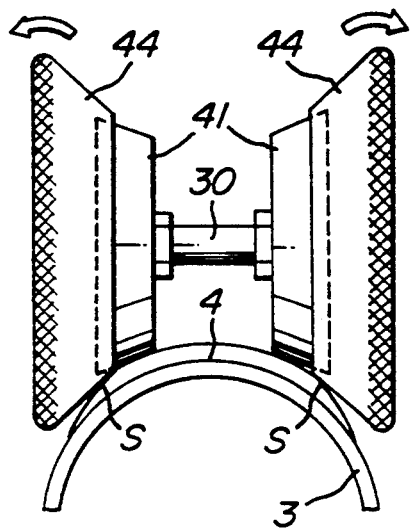
Figure 5D:
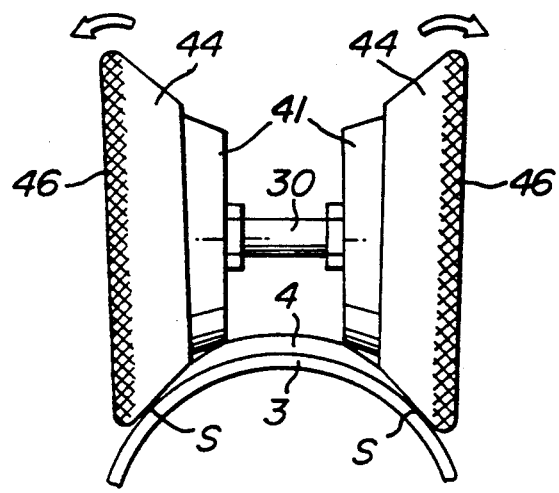

Thereafter, the motor 52 is energized to rotate the connecting shaft 30 at a low speed. In this case, because the axis P of the support shaft 33 intersects the rotational axis L of the connecting shaft 30 at the predetermined angle G, upon rotation of the connecting shaft 30 the stitching rollers 44 slowly swing about the intersection point C in the plan Q in such a manner that the edges of the stitching rollers 44 on the side near the green case 3 move toward each other. Therefore, the outer circumferences of the stitching rollers 44 at the axially inner ends come into contact with the tire component member 4, so that the rotating force of the green case 3 begins to be transmitted through the tire component member to the stitching rollers 44. As a result, the stitching rollers 44 begin to rotate about the axes P of the support shafts 33 by the rotating force transmitted from the green case 3, simultaneously urging the tire component member 4 against the green case 3 with the aid of the urging force of the cylinder 22. The stitching rollers 44 further swing under this condition so that contact points S between the tire component member 4 and the outer circumferences of the stitching rollers 44 move continuously from axially inside to axially outside of the stitching rollers 44, as particularly shown in FIGS. 5c and 5d.

Therefore, the contact points S of the stitching rollers 44 and the tire component member 4 move spirally on the circumference of the tire component member 4. In this case, the tire component member 4 is urged at the contact points S against the green case 3 and attached to it. Accordingly, the attaching of the tire component member 4 to the green case 3 is performed along the spiral passages of the contact points S. Moreover, as the the contact points S between the stitching rollers 44 and the tire component member 4 continuously move along the spiral passages from the axially inside to the axially outside of the stitching rollers 44, the air between the tire component member 4 and the green case 3 is continuously driven toward the axially outside to be exhausted or squeezed in a reliable manner. In attaching the tire component member 4 to the green case in this manner, the tire component member 4 is subjected at any points to a highly uniform attaching force so that the tire component member is rigidly and uniformly attached to the green case 3 in a positive manner.

In attaching the tire component member 4, moreover, the stitching rollers 44 contact the tire component member 4 only at the contact points S which are within narrow areas. Therefore, no circumferential slippage occurs between the stitching rollers 44 and the tire component member 4, and no scratch or score is formed on the surface of the tire component member 4. Moreover, only one pair of stitching rollers 44 are able to use in attaching wide variety of tire component members. Therefore, the apparatus according to the invention is inexpensive and simple in construction with less number of the rollers and urging means.

When the connecting shaft 30 has swung by approximately 180° and the coarse surfaces 46 of the stitching rollers 44 have just come in contact with axially outer ends of the tire component member 4, the motor 52 is deenergized to stop the swing motion of the stitching rollers 44, and at the same time the fluid pressure supplied to the cylinder 22 is raised to increase the urging force of the stitching rollers 44. As a result, the axially outer ends of the tire component member 4 are rubbed and collapsed and pressed against the green case 3 by the coarse surfaces 46 of the stitching rollers 44, so that the attached strength of the tire component member 4 to the green case 3 is improved.

In the above-mentioned embodiment, the frustoconical stitching rollers 44 are swung about the intersection points C within the narrow angles (about twice the angle G) so that the tire component member 4 is attached to the green case 3. According to the present invention, however, stitching rollers 61 may be used as shown in FIG. 6. Each stitching roller 61 is cylindrical and has such an axial length that it is slightly longer than one half of the axial length of the tire component member 4. The stitching roller 61 is swung in the plane Q within a large range so that a contact point s of the stitching roller 61 with a tire component member 4 moves continuously from the axial inner end to the axial outer end of the stitching roller 61, thereby attaching all the one half of the tire component member to a green case 3 by one stitching roller 61. In this case, the swing center of the stitching roller 61 is always on the rotational axis of the stitching roller 61 and moves from the axially inner side to the axially outer side as the swing angle becomes larger.

According to the present invention, moreover, a rotatable screw shaft may be inserted into a connecting shaft 30, and support shafts 33 may be connected to the screw shaft so that the support shafts are movable in axial directions of the connecting shaft 30 upon rotating the screw shaft. With this arrangement, in attaching the axially outer ends of a tire component member 4 to a green case 3 by means of the coarse surfaces of the stitching rollers 44, the support shafts 33 are slightly moved axially outwardly to enlarge the rubbed and collapsed ranges of the tire component member 4. In this invention, furthermore, a timer may be provided instead of the rotary encoder 57. Moreover, the conical roller 41 may be directly supported by the connecting shaft 30.

As can be appreciated from the foregoing description, the apparatus according to the present invention is simple in construction and inexpensive to manufacture, and is able to attaching a tire component member to a green case rigidly and uniformly, without remaining the air therebetween and without causing any scratch or score on the tire component member in attaching it.

While the invention has been particularly shown and described with reference to certain preferred embodiments thereof, it will be understood by those skilled in the art that the foregoing and other changes in form and details can be made therein without departing from the spirit and scope of the invention.

What is claimed is:

1. An apparatus for attaching a tire component member to a rotating toroidal green case mounted on a forming drum, comprising: support shafts whose axes are located substantially in a plane including a rotational axis of the forming drum, stitching rollers supported by the support shafts and rotatable about the axes of the support shafts, respectively, said stitching rollers formed as truncated cones such that an outer diameter increases from one side to the other, urging means for moving the stitching rollers toward the green case to urge outer circumferences of the stitching rollers against the tire component member, and swing means for swinging the stitching rollers to continuously move contact points of the stitching rollers with the tire component member from an axially inside to an axially outside to attach the tire component member to an outer surface of the green case, wherein said swing means comprises (i) a connecting shaft mounted on and fixed to said support shafts and having a rotational axis which extends in parallel with the rotational axis of the forming drum, and located substantially in said plane and inclined at a predetermined angle to said axes of the support shafts, and (ii) rotating means for swinging said stitching rollers by rotating said connecting shaft about the rotational axis.

2. The apparatus as set forth in claim 1, wherein a conical roller in the form of a frustoconical shape increasing its diameter from an axially inner side to an axially outer side is rotatably provided on an extension portion of each of said support shafts coaxial to said connecting shaft on the axially inner side of the stitching roller, respectively, and each of the stitching rollers is formed in an axially inner surface with an annular recess having a diameter slightly larger than a diameter of said conical roller at its axially outer end so that said recess of the stitching roller receives therein part of the axially outer end of the conical roller.

3. The apparatus as set forth in claim 1, wherein said predetermined angle at which the rotational axis of the connecting shaft is inclined to the axes of the support shafts is within a range from 3° to 5°.

4. The apparatus as set forth in claim 1, wherein said urging means comprises a cylinder having a piston rod to which is fixed a support plate supporting both ends of said connecting shaft.

5. The apparatus as set forth in claim 1, wherein said rotating means comprises driving means for rotating said connecting shaft, and control means for controlling said driving means.

6. The apparatus as set forth in claim 1, wherein each stitching roller has an axially outer end which is relatively more coarse than the rest of the roller.

* * * * *